(12) United States Patent
Navani

(10) Patent No.: US 9,615,209 B2
(45) Date of Patent: Apr. 4, 2017

(54) SYSTEMS AND METHODS FOR FACILITATING INTEGRATED SERVICES FOR PROVIDING ROAD-SIDE ASSISTANCE

(71) Applicant: Aman Navani, Fremont, CA (US)

(72) Inventor: Aman Navani, Fremont, CA (US)

( * ) Notice: Subject to any disclaimer, the term of this patent is extended or adjusted under 35 U.S.C. 154(b) by 0 days.

(21) Appl. No.: 14/836,935

(22) Filed: Aug. 26, 2015

(65) Prior Publication Data

US 2017/0064503 A1 Mar. 2, 2017

(51) Int. Cl.
| | |
|---|---|
| *H04M 11/04* | (2006.01) |
| *H04W 4/02* | (2009.01) |
| *G08G 1/123* | (2006.01) |
| *G07C 5/00* | (2006.01) |
| *G01S 19/42* | (2010.01) |
| *H04W 4/22* | (2009.01) |

(52) U.S. Cl.
CPC ............ *H04W 4/023* (2013.01); *G01S 19/42* (2013.01); *G07C 5/008* (2013.01); *G08G 1/123* (2013.01); *H04W 4/22* (2013.01)

(58) Field of Classification Search
CPC ... H04W 4/22; H04M 1/72519; G06F 1/1626; G06Q 30/2631
USPC ............... 455/404.2, 550.1, 556.2; 705/26.7
See application file for complete search history.

(56) References Cited

U.S. PATENT DOCUMENTS

| | | | | |
|---|---|---|---|---|
| 2007/0280462 | A1* | 12/2007 | Neece | H04M 3/5116 379/201.01 |
| 2009/0233572 | A1* | 9/2009 | Basir | H04M 3/5116 455/404.1 |
| 2012/0264395 | A1* | 10/2012 | Bradburn | H04M 3/5233 455/404.1 |
| 2013/0059575 | A1* | 3/2013 | Oesterling | H04W 4/046 455/422.1 |
| 2014/0279707 | A1* | 9/2014 | Joshua | G06Q 30/0283 705/400 |
| 2015/0161890 | A1* | 6/2015 | Huntzicker | G08G 1/147 340/932.2 |
| 2016/0092962 | A1* | 3/2016 | Wasserman | G06Q 30/0631 705/26.7 |

* cited by examiner

*Primary Examiner* — Danh Le

(74) *Attorney, Agent, or Firm* — Zackson Law LLC; Saul L. Zackson

(57) ABSTRACT

A system for facilitating multiple integrated services for providing road-side assistance via multiple assistance service providers to a user includes, a central computing device capable of communicating with the assistance service providers and the user over a wireless network, a user device associated with the user configured to transmit one or more assistance requests to the central computing device, and, a first assistance device associated with the one or more assistance service providers.

3 Claims, 5 Drawing Sheets

SYSTEMS AND METHODS FOR FACILITATING INTEGRATED SERVICES FOR PROVIDING ROAD-SIDE ASSISTANCE

BACKGROUND OF THE INVENTION

Field of the Invention

Embodiments of the present invention relate to facilitating integrated services, and more particularly, to systems and methods for facilitating integrated services for providing road-side assistance to one or more users.

Description of the Related Art

Automobile accidents contribute to large number of deaths in United States. As the vehicle population continues to grow within a limited space, traffic-jams and traffic violations have occurred and need to be solved. In a scenario when an accident occurs or there is a vehicle breakdown, there is currently no single system that assists with all the aspects of services needed at that time by the vehicle driver. In recent years, although technology has advanced tremendously there remains a need to develop an integrated system and method to deal with this problem.

Moreover, when there is a vehicle breakdown, the vehicle driver tries to identify a point of the vehicle failure, subsequently trying to locate the nearest repair shop, and finally makes a phone call to request repair. It is very frustrating for the vehicle driver to find the route to the repair shop and at the same time get the vehicle to the shop by driving it himself. In other cases, when the vehicle cannot be driven to the repair shop, the repair mechanic is called to the location to transport the vehicle to the shop. In this scenario, the driver must provide the mechanic with his current location. In the event of a vehicle breakdown in a deserted area with which the vehicle driver is not well acquainted, the driver might give wrong information about the location and the repair mechanic will take more time to arrive at the vehicle breakdown destination due to incorrect information. Therefore, the driver will be in a distressed situation and at the same time he must perform complicated tasks to make service arrangements for the vehicle repair work.

In a different scenario, the driver has to make individual calls to roadside assistance providers, EMS services and Sheriff depending on what the situation demands. The availability of these services as well as the wait time on each of these calls are unpredictable leading to significant inconvenience and danger to the victim.

Recent advances in wireless communications are diffusing into many new applications. However, the conventional available systems do not offer integrated menu of services to the vehicle driver. Moreover, the available systems do not provide real time arrival tracking status of the available services. Further, the current devices do not offer one stop shop solution for all needs of a roadside victim and do not offer real time status tracking system.

Therefore, there remains a need in the prior art to solve the problem of scattered services by bringing an integrated, expeditious and convenient solution, which is easily accessible to the driver.

SUMMARY OF THE INVENTION

Embodiments of the present disclosure provide a system for facilitating multiple integrated services for providing road-side assistance via multiple assistance service providers to a user. In one embodiment, the system includes, a central computing device capable of communicating with the assistance service providers and the user over a wireless network, a user device associated with the user configured to transmit one or more assistance requests to the central computing device, and, a first assistance device associated with the one or more assistance service providers.

Embodiments of the present disclosure further provide a method for facilitating multiple integrated services for providing road-side assistance via the multiple assistance service providers to the users. In one embodiment, the method includes the steps of, receiving multiple assistance requests, each originating from one or more users, identifying one or more assistance service providers, forwarding each request to the assistance service providers, receiving one or more responses from the assistance service providers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the present systems and methods have been described herein by way of example for several embodiments and illustrative drawings, those skilled in the art will recognize that the multiple embodiments disclosed hereinbelow are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the invention as defined by the appended claims. Any headings used herein are for organizational purposes only and are not meant to limit the scope of the description or the claims. As used herein, the word "can" and "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of the present invention relate to systems and methods for facilitating multiple integrated services for providing road-side assistance via multiple assistance service providers to users. Specifically, the embodiments of the present invention are aimed at providing an innovative application embodying systems and methods as described herein below for providing roadside assistance to the users. In use, the embodiments of present invention provide an automated approach with real-time location tracking capabilities along with intelligent matching modules to match the location of users with assistance service providers in near vicinity. In addition, the embodiments are also aimed at providing real-time notification alerts to both the users and the assistance service providers. Consequently, such innovative features embodied using various aspects of the present invention provide a centralized solution to users in need of roadside assistance.

Figure 1:
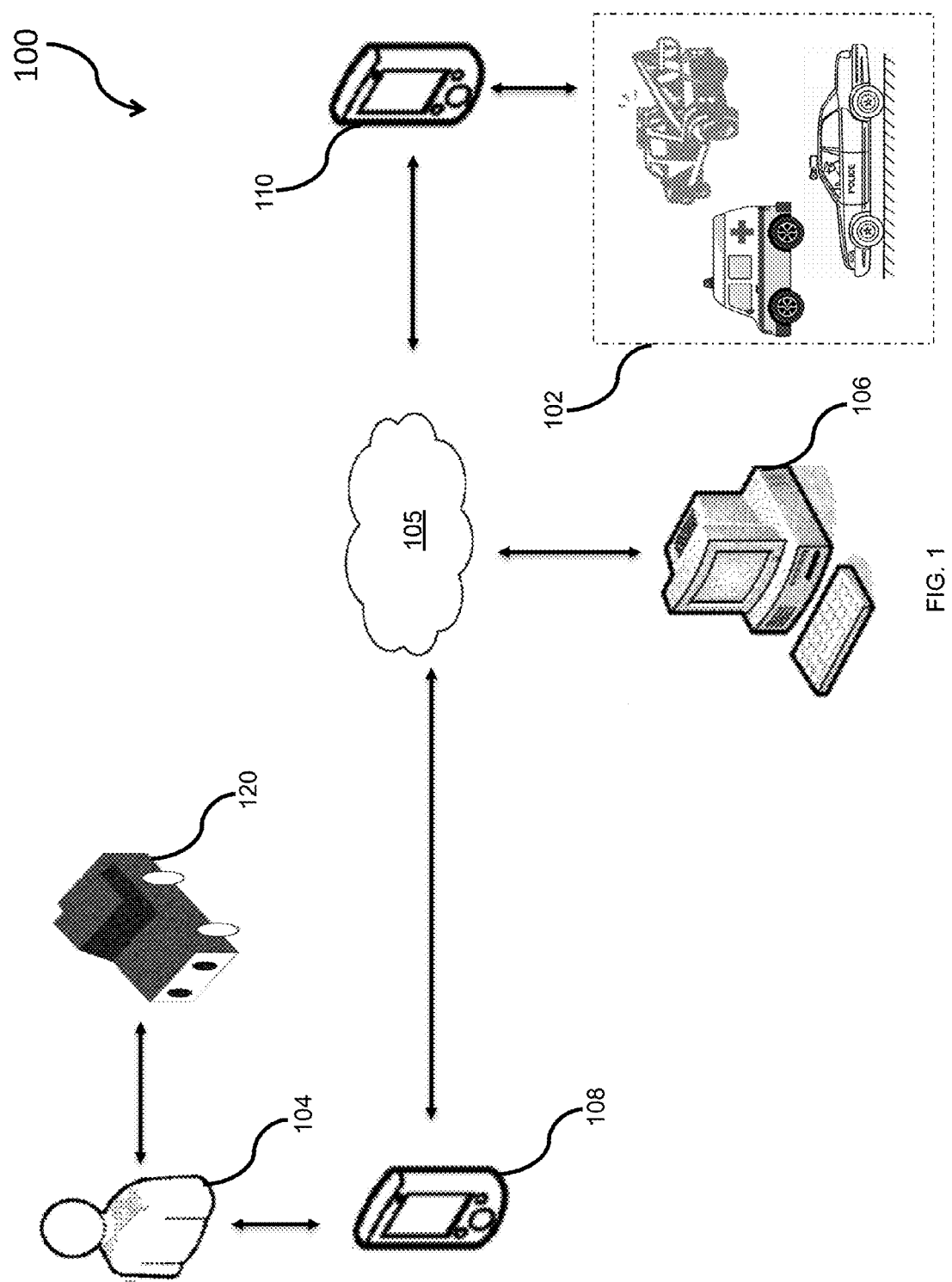
FIG. 1 illustrates a block diagram of a system for facilitating multiple integrated services for providing road-side assistance via multiple assistance service providers to a user, in accordance with one embodiment of the present invention.

FIG. 1 illustrates a block diagram of a system 100 for facilitating multiple integrated services for providing roadside assistance via multiple assistance service providers 102 to a user 104. In accordance with an embodiment of the present invention, the system 100 includes, a central computing device 106 capable of communicating with the assistance service providers 102 and the user 104 over a wireless network 105, a user device 108 associated with the user 104 configured to transmit one or more assistance requests to the central computing device 106, and, a first assistance device 110 associated with the one or more assistance service providers 102.

In use, the first assistance device 110 is configured to receive the assistance requests from the central computing device 106 and transmit second information to the user device 108 in response to receiving the assistance requests. More specifically, the second information indicates that a request for service has been received. In use, the first assistance device 110 is similar to the user device 108.

In accordance with an embodiment of the present invention, the assistance service providers 102 are in close proximity of the user 104 as established by the central computing device 106. In use, the close proximity of the assistance service providers 102 and the user 104 facilitates in providing prompt roadside assistance.

Figure 2:
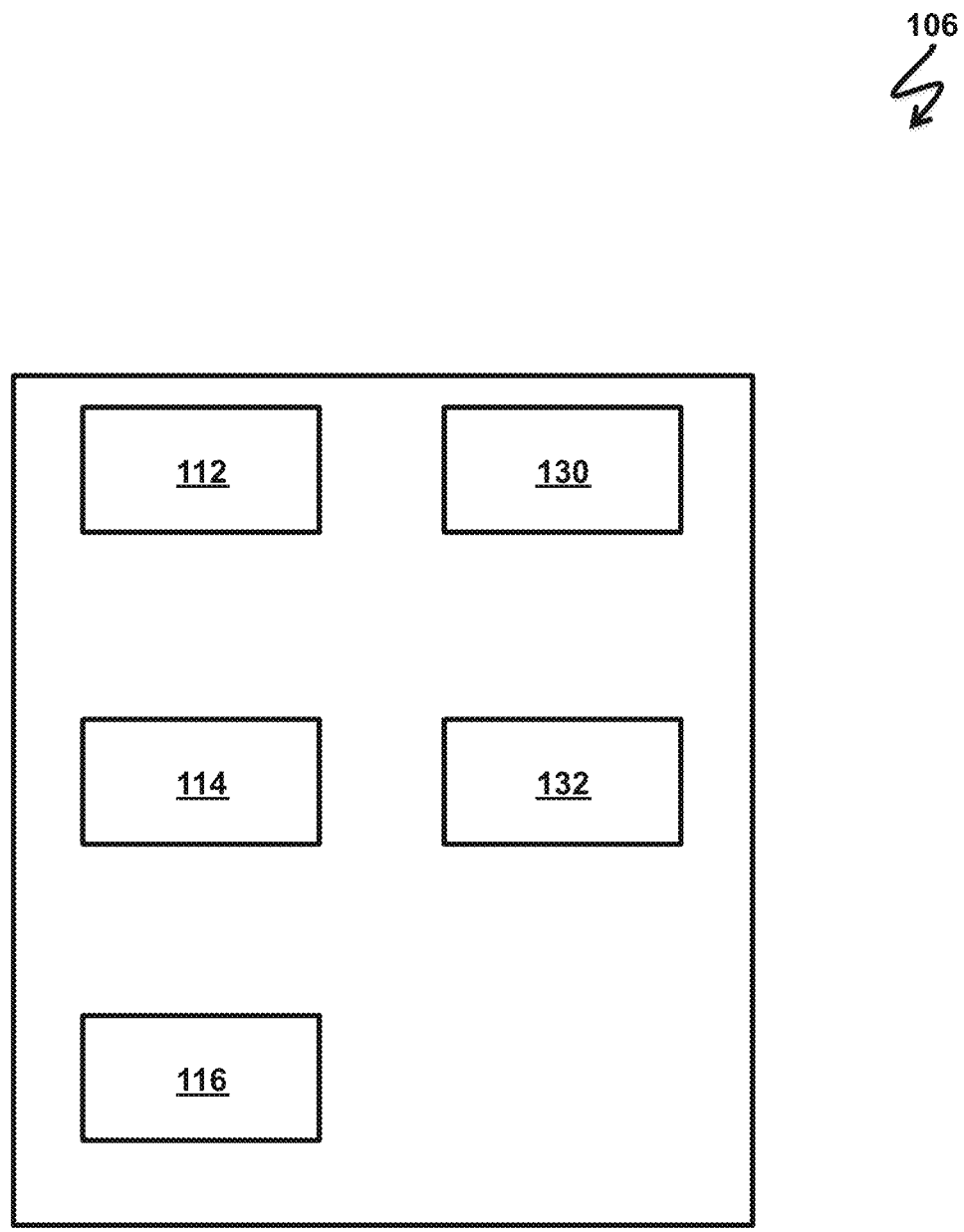
FIG. 2 illustrates a block diagram of a central computing device of the system for facilitating multiple integrated services for providing road-side assistance via multiple assistance service providers to one or more users, in accordance with one embodiment of the present invention.

In accordance with an embodiment of the present invention, the central computing device 106 further includes, a management module 112 for determining and contacting the assistance service providers 102 for handling the first assistance request based on one or more parameters as illustrated in FIG. 2 of the present invention. In use, the parameters include location coordinates of the assistance service providers 102. The central computing device 106 further includes, a matching module 114 to match location of the assistance service providers 102 with the user device 108 based on GPS coordinates, and, a retrieval module 116 to retrieve location information of the assistance service providers 102 and presenting the location information on a display 118 of the user device 108 indicating movement of the first assistance device in real time 110. In use, the central computing device 106 ensures that the assistance service providers 102 from the nearest location of the user device 108 (as determined by GPS coordinates) are matched to provide roadside assistance.

In accordance with an embodiment of the present invention, the user device 108 is a handheld device and or an integrated device mounted on a user vehicle 120. In use, the user device 108 is a handheld device, such as, for example, but not limited to, a smartphone, a tablet, a laptop, and the like. Similarly, first assistance device 110 is also a handheld device, such as, for example, but not limited to, a smartphone, a tablet, a laptop, and the like.

Figure 3:
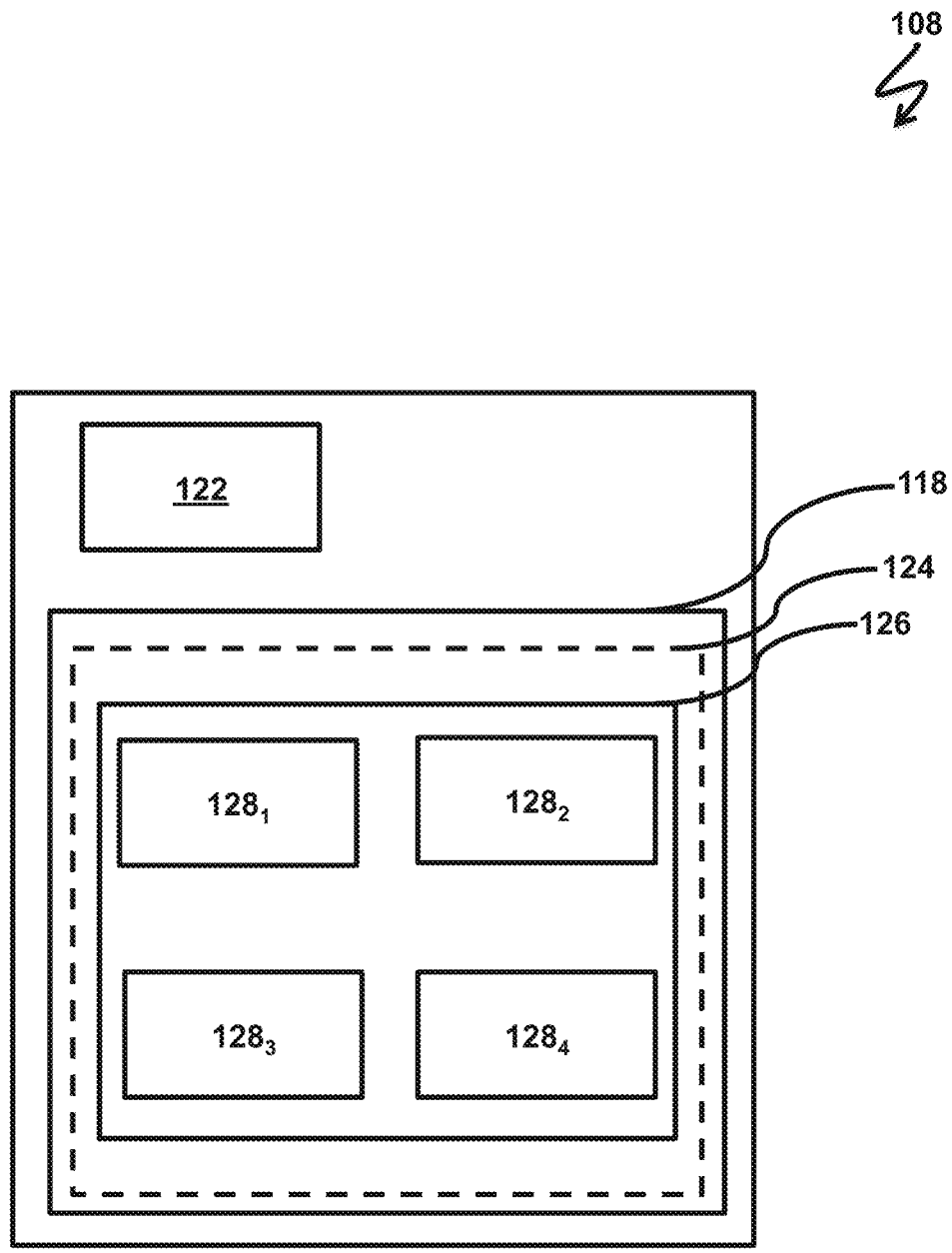
FIG. 3 illustrates a block diagram of a user device of the system for facilitating multiple integrated services for providing road-side assistance via multiple assistance service providers to a user, in accordance with one embodiment of the present invention.

In accordance with an embodiment of the present invention, the user device 108 includes, a location tracking module 122 for locating and tracking location of the user device 108 in real-time, and, an assistance module 124 for providing the integrated services to the user 104 as illustrated in FIG. 3 of the present invention. In use, the assistance module 124 includes an interface 126 operative to provide multiple graphical icons 128 to the user 104 corresponding to the multiple assistance service providers 102 capable of providing the multiple integrated services to the user 104. Furthermore, one or more graphical icons 128 are operative to receive the assistance requests. More specifically, the graphical icons 128 are further operative to register the user 104 with the central computing device 106. Those of ordinary skill in the art will appreciate that the graphical icons 128 ($128_1$, $128_2$, $128_3$, $128_4$, . . . $128_n$) may be configured as per need to embody various systems and methods as disclosed herein.

In accordance with an embodiment of the present invention, the central computing device 106 further includes, a cancellation module 130 for cancelling a duplicate request, and, an alternate option module 132 for arranging one or more assistance service providers 102 from an alternate location in case of refusal or no response. In use, in case of non-availability of any of the assistance service providers 102 or cancellation of request by any of the assistance service providers 102, the alternate option module 132 arranges for alternative assistance service providers 102 from next possible locations in the proximity of the user 104. Similarly, in case of confirmation of same request by two or more similar assistance service providers 102, the cancellation module 130 cancels the duplicate request.

In accordance with an embodiment of the present invention, multiple integrated services includes emergency medical service, Sheriff service, road side assistance, road side repair, and the like. Specifically, the emergency medical service may include mobile medical units, such an ambulance for use by emergency personnel. Those of ordinary skill in the art will appreciate that various embodiments of the present invention may further be embodied to provide additional integrated services, such as, for example, but not limited to, providing navigation guidance to assistance service providers 102, thereby providing roadside services to the user 104 via traffic free zones for quick assistance. In addition, such integrated services may further include providing assistance with comfort services such as hotels, restaurants or rest areas, and the like.

Figure 4:
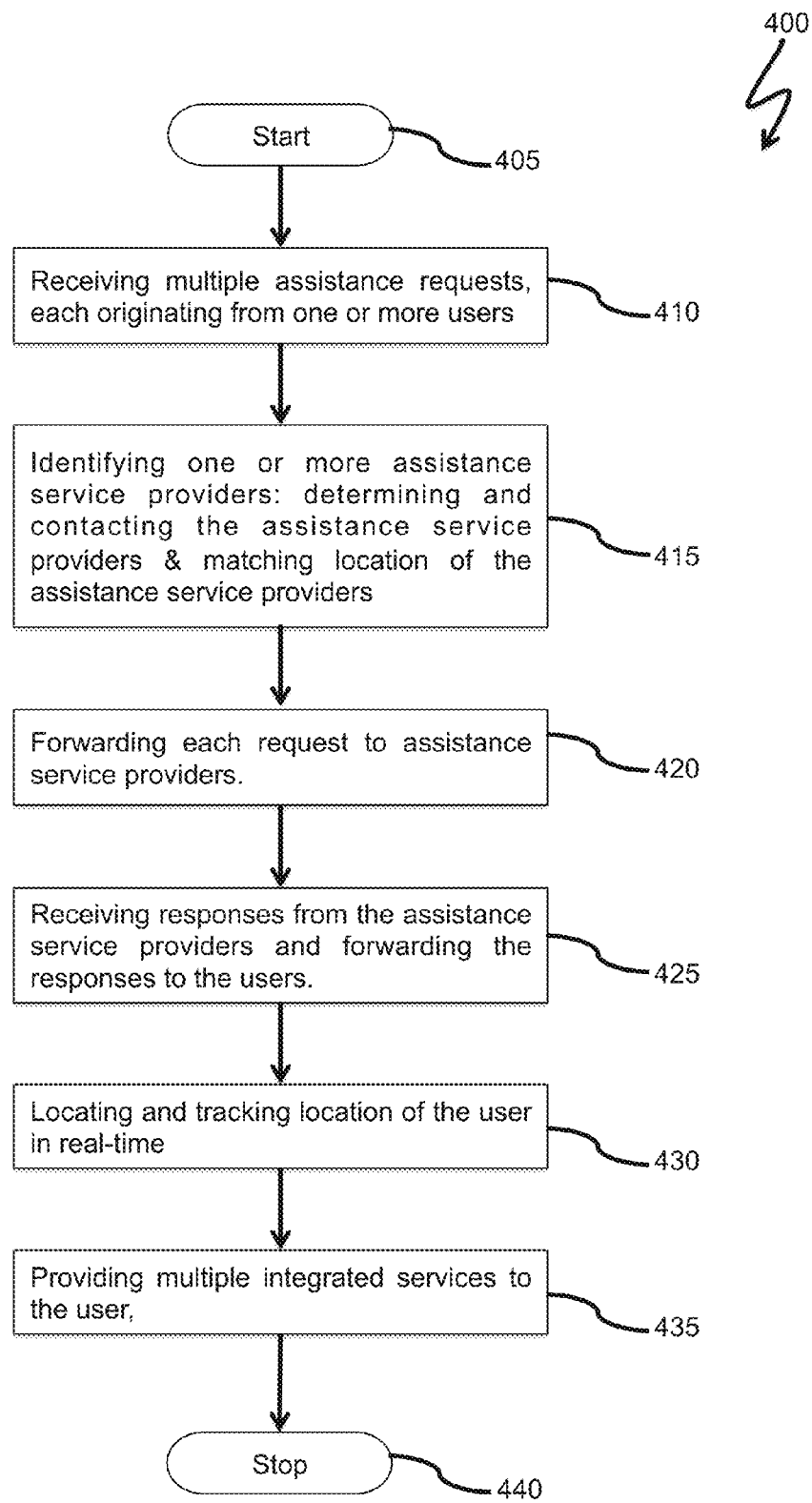
FIG. 4 illustrates a flowchart of a method for facilitating multiple integrated services for providing road-side assistance via multiple assistance service providers to one or more users, in accordance with one embodiment of the present invention.

FIG. 4 illustrates a flowchart of method 400 for facilitating multiple integrated services for providing road-side assistance via multiple assistance service providers 102 to a user 104, in accordance with one embodiment of the present invention. In accordance with an embodiment of the present invention, the method 400 for facilitating multiple integrated services for providing road-side assistance via the multiple assistance service providers 102 to the users 104 begins at step 405 and proceeds to step 410. At step 410, the method 400 includes, receiving multiple assistance requests, each originating from one or more users 104. The method 400 then proceeds to step 415. At step 415, the method 400 includes, identifying one or more assistance service providers 102 and the method 400 then proceeds to step 420. At step 420, the method 400 includes forwarding each request to the assistance service providers 102 and the method 400 then proceeds to step 425. At step 425, the method 400 includes receiving one or more responses from the assistance service providers 102 and forwarding the responses to the users 104. In use, the assistance service providers 102 are in close proximity of the users 104.

In accordance with an embodiment of the present invention, the step 415 of identifying the assistance service providers 102 includes, determining and contacting the assistance service providers 102 for handling the first assistance request based on one or more parameters, which include the location coordinates of the assistance service provider 102. The step 415 further includes matching location of the assistance service providers 102 with the user 104 based on GPS coordinates, and, retrieving location information of the assistance service provider 102 and presenting the location information 102 to the user 104 in real time.

In accordance with an embodiment of the present invention, the method 400 proceeds to step 430 from step 425. At step 430, the method 400 includes locating and tracking location of the user 104 in real-time and the method 400 then proceeds to step 435. At step 435, the method 400 includes providing multiple integrated services to the user 104 and the method 400 ends at step 440.

In accordance with an embodiment of the present invention, the method 400 is embodied by providing multiple graphical icons 128 to the user 104 corresponding to the multiple assistance service providers 102 capable of providing the multiple integrated services to the user 104. In addition, the method 400 further allows the user 104 to register by using personal information. For example, the user 104 may register by providing a first name, a last name, an email address, a phone number, a physical address, an emergency contact number, and the like.

In accordance with an embodiment of the present invention, the method 400 is further embodied by, cancelling a duplicate request, and, arranging the assistance service provider 102 from an alternate location in case of refusal or no response.

Figure 5:
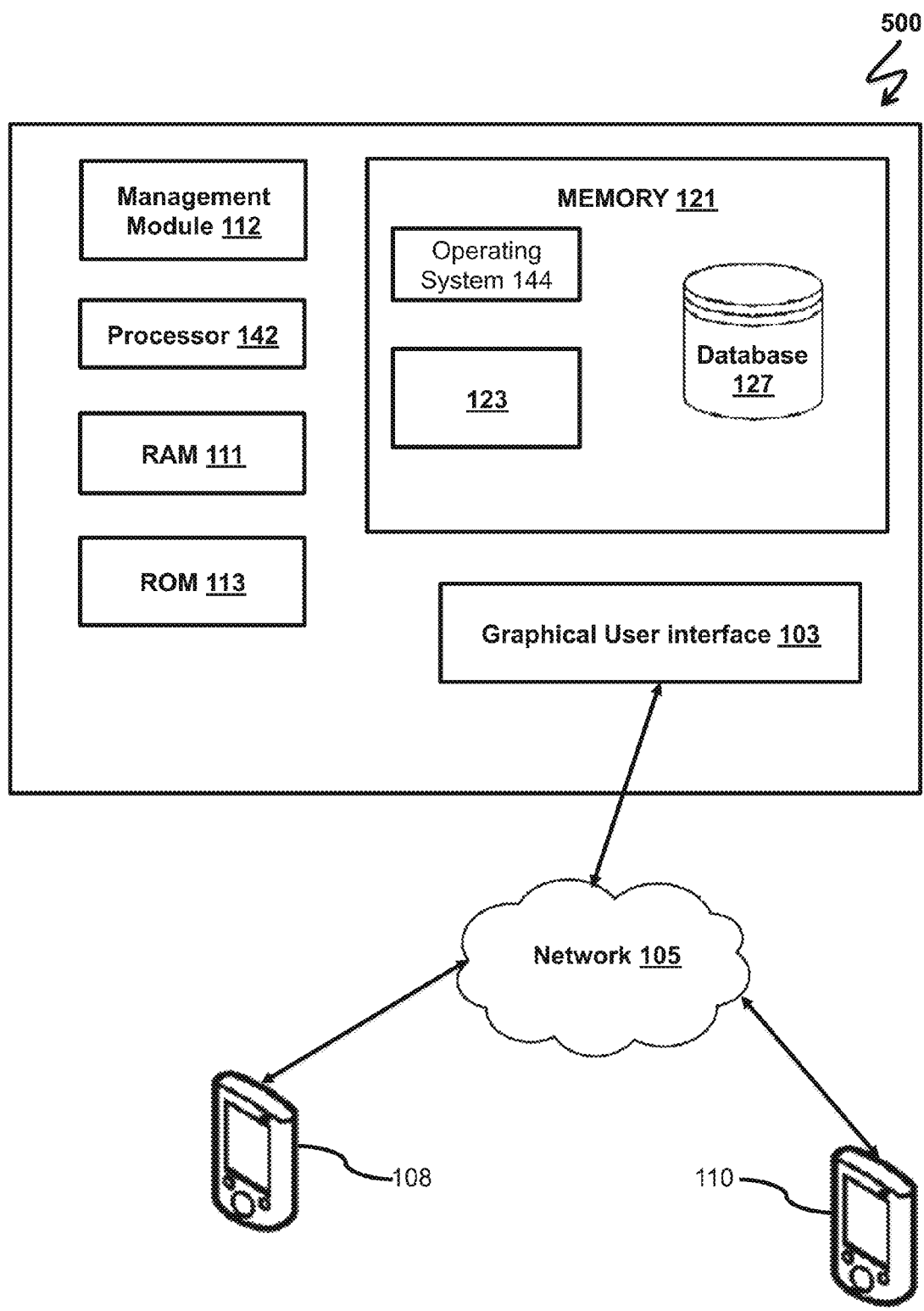
FIG. 5 illustrates a system architecture of a computing device for facilitating multiple integrated services for providing road-side assistance via multiple assistance service providers to a user, in accordance with one embodiment of the present invention.

FIG. 5 illustrates a system architecture of a computing device 500 for facilitating multiple integrated services for providing road-side assistance via multiple assistance service providers 102 to a user 104, in accordance with one embodiment of the present invention. The computing device 500 may be similar to any available computing device, such as a personal computer (e.g., a desktop computer), server, laptop computer, notebook, tablet, smartphone, etc. The computing device 500 may have a management module 112 for determining and contacting the assistance service providers 102 for handling the first assistance request based on one or more parameters. In use, the parameters include location coordinates of the assistance service providers 102. Moreover, the computing device 100 may have the other modules discussed above for performing methods and executing instructions of the roadside assistance service described above. The one or more modules explained above may be implemented with one or more processors and one or more storage units (e.g., databases, RAM, ROM, and other computer-readable media), one or more application specific integrated circuits (ASICs), and/or other hardware components.

The one or more processors of the management module 112 may operate in addition to or in conjunction with another general processor 142 of the computing device 500.

Both the management module 112 and the processor 142 may be capable of controlling operations of the computing device 500 and its associated components, including RAM 111, ROM 113, the graphical user interface 103, and memory 121. The memory 121 may be any computer readable medium for storing computer executable instructions (e.g., software). The instructions stored within memory 121 may enable the computing device 500 to perform various functions. For example, memory 121 may store software used by the computing device 500, such as an operating system 144 and application programs 123, and may include a database 127. The graphical user interface 103 allows the computing device 500 to connect to and communicate with the network 105. The network 105 may be any type of network, including a local area network (LAN) and/or a wide area network (WAN), such as the Internet, a cellular network, a private network, a satellite network or other platforms. The network 105 may operate in accordance with one or more communication standards, such as standards promulgated by the Institute of Electrical and Electronics Engineers (IEEE) (e.g., an IEEE 802.11 standard). Through the network 105, the computing device 500 may communicate with one or more user devices 108 and one or more first assistance devices 110, such as laptops, notebooks, smartphones, personal computers, servers, etc. The user devices 108 may also be configured in a similar manner as computing device 500. In some embodiments the computing device 500 may be connected to the user devices 108 and first assistance devices 110 to form a "cloud" computing environment.

In one embodiment, a computing device 500 for facilitating multiple integrated services for providing road-side assistance via multiple assistance service providers 102 to multiple users 104 includes, a graphical user interface 103 for communicating, via a network 105, with one or more user devices 108 and one or more first assistance devices 110, and, one or more central processor 142 configured to execute multiple instructions, including, all the steps of method 400. In use, the computing device 500 is similar to the central computing device 106, as explained hereinabove.

Therefore, as may be seen, various embodiments of the present invention disclose systems and methods for facilitating multiple integrated services for providing road-side assistance via multiple assistance service providers to multiple users. In case of an accident or vehicle breakdown, embodiments of the present invention will provide a single solution that assists with all aspects of services needed at the time. Subsequently, users will not have to make individual calls to roadside assistance, EMS services and Sheriff depending on what the situation demands. The users can avoid significant inconvenience and possible dangers by using embodiments of the present invention as the availability of these services as well as the wait time on each of these calls are unpredictable in general.

As may be seen from above-mentioned description of various embodiments, the users are provided with a simple and interactive application on their handheld devices (such as, a smart phone) and with just a few interactions with graphical user icons, the users can request and track the arrival status of any or all of the roadside services as desired. In specific embodiments, the users are also offered multiple choices based on expected arrival times to the location of the user.

Moreover, as compared to previously available solutions to users, the embodiments of the present invention provide significant improvements and advantages by providing the users with an integrated menu of services all from a single application accessed through a smart phone and with real time GPS tracked status report of any or all of the services, including novel aspects such as, but not limited to, real time GPS tracked status report of any or all of the services. Therefore, as may be seen, embodiments of the present invention provide an integrated, expeditious and convenient solution accessible from user's smart phone. In addition, the applications that embody various aspects of the present invention are highly interactive and GPS tracking is specific to the service lines available to the users.

Accordingly, while there has been shown and described the preferred embodiment of the invention is to be appreciated that the invention may be embodied otherwise than is herein specifically shown and described and, within said embodiment, certain changes may be made in the form and arrangement of the parts without departing from the underlying ideas or principles of this invention within the scope of the claims appended herewith.

What is claimed is:

1. A system for facilitating a plurality of integrated services for providing road-side assistance via a plurality of assistance service providers to a user, said system comprising:
    a central computing device capable of communicating with said plurality of assistance service providers and said user over a wireless network;
    a user device associated with said user configured to transmit at least one assistance request to said central computing device;
    a first assistance device associated with said at least one assistance service provider of said plurality of assistance service providers, said first assistance device being configured to receive said at least one assistance request from said central computing device and transmit information to said user device in response to receiving said at least one assistance request, wherein said information indicates that a request for service has been received, wherein said central computing device comprises a management module for determining and contacting said at least one assistance service provider for handling said first assistance request based on at least one parameter, wherein said at least one parameter comprises location coordinates of said at least one assistance service provider, a matching module to match location of said at least one assistance service provider with said user device based on GPS coordinates, and a retrieval module to retrieve location information of said at least one assistance service provider and to present said location information on a display of said user device indicating movement of said first assistance device in real time, a cancellation module for cancelling a duplicate request, and, an alternate option module for arranging said at least one assistance service provider from an alternate location in case of refusal or no response,
    wherein said at least one assistance service provider is in close proximity of said user as established by said central computing device.

2. A method for facilitating a plurality of integrated services for providing road-side assistance via a plurality of assistance service providers to a plurality of users, said method comprising the steps of:
    receiving a plurality of assistance requests, each originating from at least one user of said plurality of users;
    identifying at least one assistance service provider from said plurality of assistance service providers;
    forwarding each request of said plurality of assistance requests to said at least one assistance service provider;
    receiving at least one response from said at least one assistance service provider and forwarding at least one response to said at least one user;
    cancelling a duplicate request; and,
    arranging said at least one assistance service provider from an alternate location in case of refusal or no response, wherein said at least one assistance service provider is in close proximity of said at least one user.

3. A computing device for facilitating a plurality of integrated services for providing road-side assistance via a plurality of assistance service providers to a plurality of users, said computing device comprising:
    a graphical user interface for communicating, via a network, with at least one user device and at least one first assistance device; and,
    at least one central processor configured to execute a plurality of instructions, said instructions comprising receiving a plurality of assistance requests, each originating from at least one user of said plurality of users, identifying at least one assistance service provider from plurality of assistance service providers, forwarding each request of said plurality of assistance requests to said at least one assistance service provider, receiving at least one response from said at least one assistance service provider and forwarding at least one response to said at least one user, providing a plurality of graphical icons to said user corresponding to said plurality of assistance service providers capable of providing said plurality of integrated services to said user, cancelling a duplicate request and, arranging said at least one assistance service provider from an alternate location in case of refusal or no response wherein said at least one assistance service provider is in close proximity of said at least one user.

* * * * *